United States Patent [19]

Damsky

[11] 4,069,914
[45] Jan. 24, 1978

[54] SHIPPING, STORAGE AND HANDLING DEVICE FOR CONVOLUTELY WOUND MAGNETIC TAPE ASSEMBLIES

[76] Inventor: Arnold M. Damsky, 821 83rd St., Miami Beach, Fla. 33141

[21] Appl. No.: 736,730

[22] Filed: Oct. 29, 1976

[51] Int. Cl.$^2$ .................. B65D 85/67; B65D 85/671; B65D 85/672
[52] U.S. Cl. ................................ 206/303; 206/394; 206/509; 206/821
[58] Field of Search ............... 206/394, 393, 509, 499, 206/387, 389, 512, 511, 303, 309, 821, 403, 405, 516; 217/26.5

[56] References Cited

U.S. PATENT DOCUMENTS

| | | | |
|---|---|---|---|
| 2,623,633 | 12/1952 | Bladow | 206/509 |
| 2,700,463 | 1/1955 | McCormick | 206/394 |
| 2,918,342 | 12/1959 | Tarte, Jr. | 206/393 |
| 3,685,646 | 8/1972 | Sy | 217/26.5 |

Primary Examiner—William T. Dixson, Jr.
Attorney, Agent, or Firm—Ernest H. Schmidt

[57] ABSTRACT

A shipping, storage and handling device for commercial magnetic tape furnished by the manufacturer as windings convoluted about the periphery of flat annular cores or spools, comprising a unit, such units being referred to as "pancakes" in the trade. The device comprises a flat annular base portion having a plurality of upstanding pins and a like plurality of through openings, the pins and openings being symmetrically arranged about a common concentric circle so that, upon vertical stacking of the devices, the pins of each lower device will be received within the openings of the next successive device. The upstanding pins extend through complementary openings provided in each tape winding support core or spool to locate the "pancakes" coaxially and in face-to-face engagement upon respective devices for individual support thereupon, the lengths of the pins being such as to extend just beyond the upper surface of a supported "pancake" to provide for interlocking engagement with the through openings of the next successive device, thereby preventing relative sideslipping of the thus stored "pancakes" while at the same time allowing for their removal, one at a time, for combinative use with their respective supporting devices.

4 Claims, 3 Drawing Figures

U.S. Patent
Jan. 24, 1978
4,069,914
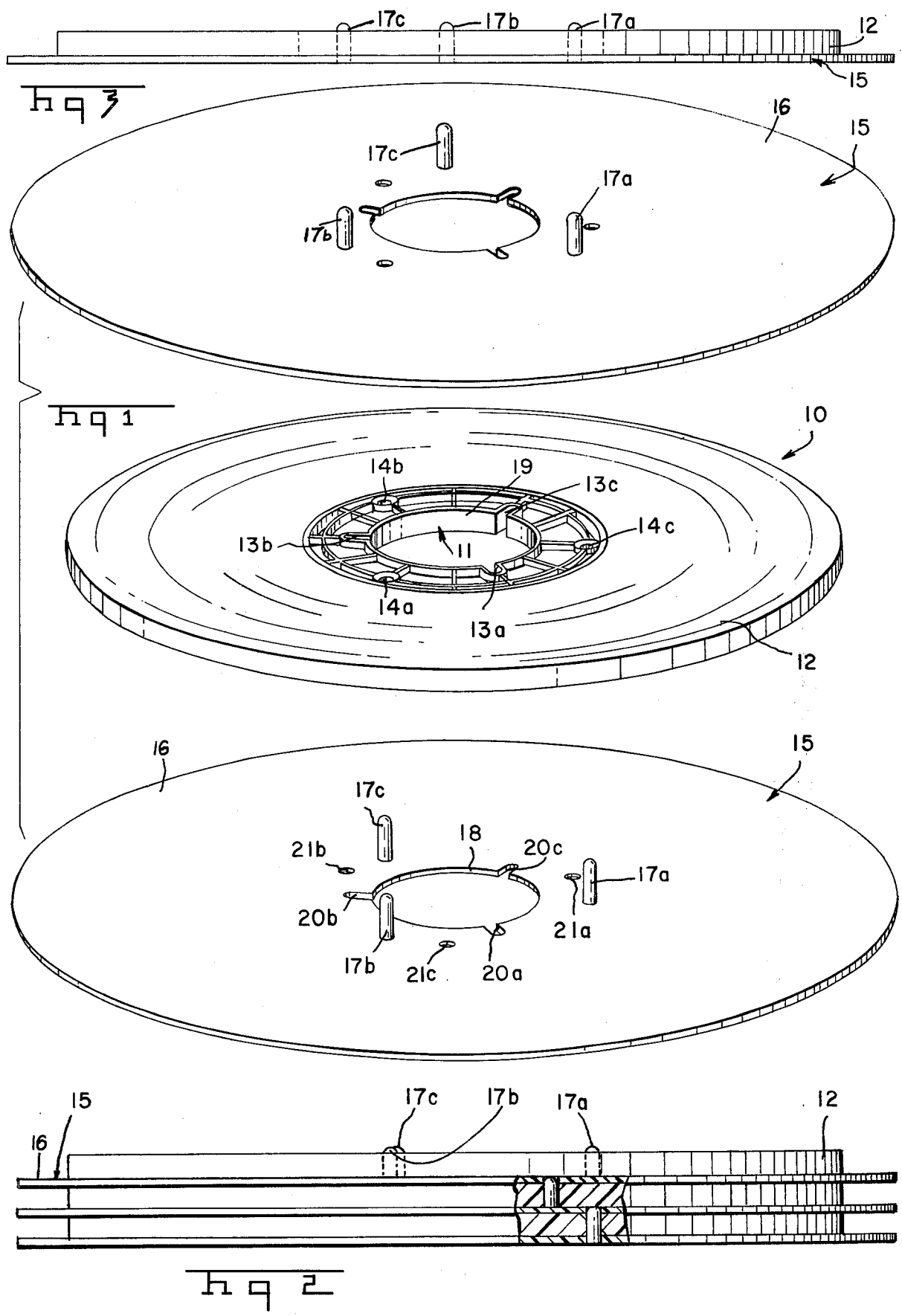

SHIPPING, STORAGE AND HANDLING DEVICE FOR CONVOLUTELY WOUND MAGNETIC TAPE ASSEMBLIES

In the production and reproduction of musical magnetic tapes the blank tape is provided by the magnetic tape manufacturer as a long winding on a flat central core. Typically, commonly referred to in the trade as the NAB (National Association of Broadcasters), the central core, has an outer diameter of about 5½ inches and the amount of tape wound thereon is of such a length to extend the diameter up to 15 inches or more. In the trade, such units of blank magnetic tape furnished by the manufacturer are referred to as "pancakes" due to their visual likeness to a large pancake. The principal difficulty in the handling of these "pancakes" is that no support is provided for the windings on their cores other than that afforded by the tension of the windings themselves. For this reason they must be handled with utmost care both in shipment and in subsequent transfer for use on rotary drive hubs of recording and winding equipment employed in the manufacture and duplication of musical tapes, particularly 8-track cartridge tapes.

Notwithstanding careful handling, however, "breakage" or "explosion" of the pancakes, that is, slippage and consequent release of pressure of a portion of the winding off the spool assembly, is a common occurrence. The resultant entangling of the tape renders that portion outward of the break worthless, since any attempt at rewinding would be so laborious and time consuming as to be economically unfeasible.

In order to overcome the above-described difficulties with the transportation and handling of magnetic tape "pancakes", various types of unitary winding core and annular tape winding support flange or flanges (one at each side) have heretofore been proposed. Such winding support devices, however, are deficient in various respects, principally in that they do not provide for compatible use with commercial recording and winding equipment as are the N.A.B. cores or spools. Unitary winding core and single supporting side flange devices are deficient in that upon turning over pancake tapes that have had music or other sound recorded thereon, as might be necessary for unwinding to transfer the tape to individual cartridges, there will no longer be support of the pancake tape from underneath, thereby rendering it unsuitable for further transfer winding.

It is, accordingly, the principal object of this invention to provide a novel and improved shipping, storage and handling device for convolutely wound magnetic tape assemblies that obviates the deficiencies of heretofore devised handling devices for "pancake" magnetic tape assemblies or units.

A more particular object of the invention is to provide a "pancake" handling device of the above nature that will be compatible for use with commercial recording and winding equipment in the production of musical tapes and which, at the same time, is adapted for ready transfer from support of one side of the "pancake" by one of the devices to support from the other side of the "pancake" by an identical handling device, thereby to provide for transfer winding and the like without any danger of the magnetic tape "exploding" from its assembly spool or core.

Another object of the invention is to provide a shipping, storage and handling device of the character described comprising a flat annular base portion having a pluraltiy of upstanding pins and a like plurality of through openings, the pins and openings being symmetrically arranged about a common concentric circle so that, upon vertical stacking of the devices, the pins of each lower device will be received within the openings of the next successive device, with the magnetic tape "pancakes" sandwiched between successive devices thereof.

Another object of the invention is to provide a shipping, storage and handling device of the character above described wherein the outer diameter of the flat annular base portion will be greater than the outer diameter of the convolutely wound magnetic tape assembly or unit with which it is to be used, thereby providing for support of the tape winding along its full diameter while at the same time defining annular recesses between adjacent ones of the thus stacked "pancake" supporting devices to facilitate manual lifting and separation of one or more of the supported "pancakes" as may be required from time to time.

Yet another object of the invention is to provide a shipping, storage and handling device of the character described that is unitary in construction and which can be economically manufactured in quantity production by injection molding techniques.

Other objects, features and advantages of the invention will be apparent from the following description when read with reference to the accompanying drawings. In the drawings, wherein like reference numerals denote corresponding parts throughout the several views:

FIG. 1 is an exploded oblique view of a blank tape or "pancake" and further illustrates the inter-assembly therewith of lower and upper transporting and handling devices embodying the invention as used in shipping and storage;

FIG. 2 is an elevational view, with portions broken away, of a stack of three "pancakes" of blank magnetic tape supported in stacked relation prior to use by transporting and handling devices embodying the invention; and FIG. 3 illustrates a single transporting and handling device supporting a blank magnetic tape or "pancake" as separated from a stack as illustrated in FIG. 2, for use with recording and winding equipment as a unit.

Referring now in detail to the drawings, reference numeral 10 designates, generally, a typical magnetic tape blank or "pancake" as furnished by the manufacturer, the same comprising a central annular spool 11 upon which the strip magnetic tape 12 may be continuously wound to a diameter of 15 inches or more. The annular spool or core 11 may be integrally molded of a rigid synthetic plastic material and is formed about its inner periphery with three radially-extending, equidistantly-spaced slots 13a, 13b and 13c adapted to interfit with projecting means of drive hubs or spindles comprising recording and winding equipment with which the magnetic tape is to be used in recording, winding, etc. The core 11 is also formed with three through openings 14a, 14b and 14c equidistantly angularly-spaced near the outer periphery thereof and centrally disposed between the slots 13a, 13b and 13c.

The transporting and handling device embodying the invention, designated generally by reference numeral 15, is preferably integrally molded of a tough, synthetic plastic material and comprises a flat annular base support portion 16 and three upstanding pins 17a, 17b and 17c symmetricajly disposed about the circular central opening 18. The central opening 18 is of substantially the same diameter as that of the central opening 19 of the core 11 with which it is to be used, and is formed with three radially-extending, equidistantly-rotatively-spaced slots 20a, 20b and 20c of the same size and relative location as the slots 13a, 13b and 13c in said core. The transporting and handling device 15 is also provided with three through openings 21a, 21b and 21c equidistantly-radially-spaced about the circle defined by the upstanding pins 17a, 17b and 17c, said through openings being somewhat circularly offset from said upstanding pins. As described above, it will be noted that each of the pins 17a, 17b and 17c, the slots 20a, 20b and 20c, and the through openings 21a, 21b and 21c are mutually spaced by 120 circular degrees about their respective circles. The upper ends of the pins 17a, 17b and 17c may be rounded, as indicated at 22 in FIG. 1, or otherwise formed to interfit with the next vertically stacked device.

In use, the manufacturer will provide each of the "pancake" units 10 with its own supporting device 15 embodying the invention, (see FIG. 3), and the "pancakes" thus supported will be vertically stacked for shipment and storage as illustrated in FIG. 2. In this connection, it will be noted that the pins 17a, 17b and 17c are of such length as to extend through the "pancake" core openings 14a, 14b and 14c to project therebeyond just sufficiently to locate or index in the openings 21a, 21b and 21c of the next successive handling device 15. The stacked supporting and handling devices 15 and their associated "pancakes" 10 will thus be interlocked to obviate relative sideward slippage. A large number of supported "pancakes" thus stacked can be packaged in a confining rectangular box or carton with minimum danger of damage during shipment, and can conveniently be stored in the shipping container until ready for use. When needed, the required number of supported "pancakes" can easily be removed from the top of the stack or individually separated simply by inserting the fingers under opposite edge portions of the selected amount of supporting and handling devices 15 and lifting from the remainder of the stack.

It will be understood that a "pancake" 10 and its supporting device 15 will fit as a unit on rotary drive hubs or recording and winding equipment used in the manufacture and duplication of musical tapes, the central opening 18 and associated slots 20a, 20b and 20c of the supporting device being of the same configuration as and in full alignment with the central opening 19 and slots 13a, 13b and 13c of the pancake core 11.

Whenever it becomes necessary to turn the "pancake" over or "upsidedown", as may be necessary for unwinding recorded tape upon transfer to individual cartridges, it is a simple matter to flip the "pancake" supported from one side to another supporting device 15 applied from the opposite side while at the same time removing the first supporting device for future use. Such transfer of the "pancake" can be accomplished easily and with ordinary care without danger of tape breakage or "explosion".

While I have illustrated and described herein only one form which my invention can conveniently be embodied in practice, it is to be understood that this embodiment is presented by way of example only and not in a limiting sense. My invention, in brief, comprises all the embodiments and modifications coming within the scope and spirit of the following claims.

What I claim as new and desire to secure by Letters Patent is:

1. A shipping, storage and handling device for commercial magnetic tape supplied as long lengths thereof convolutely wound about the peripheral edge of a flat, annular central core defining a central core opening and having a plurality of through openings, symmetrically disposed about a common coaxial circle, comprising, in combination, a flat, annular base support member defining a central through opening, a plurality of pins upstanding from one side of said base support member, a corresponding plurality of openings in said base support member, said pins and said openings being symmetrically arranged about a common concentric circle so that, upon concentric vertical stacking of the devices, the pins of each lower device will be received within the openings of the next successive device, said pins being so located on said base support member as to fit through said core openings upon one or more of said cores being concentrically sandwiched between successive ones of said stacked devices, said central opening of said annular base support member being substantially equal in diameter to the diameter of the central core opening of the magnetic tape unit to be handled, the individual lengths of said pins being greater than the thickness of the central core but no greater than the combined thickness of the central core and the thickness of said base support member.

2. A device as defined in claim 1 wherein the terminal end of each of said individual pins is rounded.

3. A device as defined in claim 2 wherein said base support member and said plurality of upstanding pins are integrally formed of a synthetic plastic material.

4. A device as defined in claim 3 wherein said plurality of pins and said plurality of openings in said base support member are each three in number.

* * * * *